(12) United States Patent
van Welzen et al.

(10) Patent No.: US 11,617,951 B2
(45) Date of Patent: Apr. 4, 2023

(54) AUTOMATICALLY GENERATED ENHANCED ACTIVITY AND EVENT SUMMARIES FOR GAMEPLAY SESSIONS

(71) Applicant: NVIDIA Corporation, Santa Clara, CA (US)

(72) Inventors: James Lewis van Welzen, Sandy, UT (US); Glenn R. Cochran, Campbell, CA (US); Jean Wang, San Jose, CA (US); Po-Shih Wang, San Jose, CA (US); Jeffrey David Weintraub, Scottsdale, AR (US); Toshant Sharma, Punjab (IN); Shyam Raikar, Maharashtra (IN)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/359,961

(22) Filed: Jun. 28, 2021

(65) Prior Publication Data
US 2022/0410004 A1     Dec. 29, 2022

(51) Int. Cl.
A63F 13/537     (2014.01)

(52) U.S. Cl.
CPC ................... *A63F 13/537* (2014.09)

(58) Field of Classification Search
CPC ............... A63F 2300/535; A63F 13/537; A63F 2300/308; A63F 2300/634
See application file for complete search history.

(56) References Cited

U.S. PATENT DOCUMENTS

| | | | |
|---|---|---|---|
| 9,875,580 B2* | 1/2018 | Cannon | G06T 19/006 |
| 11,392,717 B1* | 7/2022 | Friedlander | G01S 19/01 |
| 2008/0096663 A1* | 4/2008 | Lieberman | A63F 13/497 463/42 |

(Continued)

OTHER PUBLICATIONS

"Capture Your Best Plays With Outplayed", Outplayed—Automatically Capture your Best Plays and Highlights|An Overwolf App, pp. 1-4, Retrieved from URL : https://go.overwolf.com/outplayed/, Retrieved on : Jun. 30, 2021.

(Continued)

*Primary Examiner* — Steve Rowland
(74) *Attorney, Agent, or Firm* — Taylor English Duma L.L.P.

(57) ABSTRACT

A game summary may be produced using an event log of in-game events and corresponding game content based on game data associated with a gameplay session(s). The event log may include metadata that indicates times of in-game events and associations between in-game events and game content items that capture the in-game events. A user may interact with in-game events with temporal context, allowing for more informed selections and a better understanding of the gameplay session. Using the event log, a game summary may provide such features as a timeline to convey relative timing of in-game events, a list of in-game events, a map of a virtual environment of the game that is temporally annotated based on in-game events, game status information, and statistical and performance information. A game summary may show trends over time and/or game sessions and convey information for selected sets of players, such as teams.

20 Claims, 10 Drawing Sheets

(56) References Cited

U.S. PATENT DOCUMENTS

| | | | |
|---|---|---|---|
| 2011/0107220 A1* | 5/2011 | Perlman | H04L 65/401 |
| | | | 715/720 |
| 2012/0100910 A1* | 4/2012 | Eichorn | A63F 13/497 |
| | | | 463/31 |
| 2014/0187323 A1* | 7/2014 | Perry | A63F 13/21 |
| | | | 463/31 |
| 2015/0224408 A1* | 8/2015 | Hayashida | A63F 13/88 |
| | | | 463/31 |
| 2016/0158656 A1* | 6/2016 | Condrey | A63F 13/63 |
| | | | 463/31 |
| 2016/0317933 A1* | 11/2016 | Shoshan | A63F 13/422 |
| 2017/0157512 A1* | 6/2017 | Long | A63F 13/497 |
| 2017/0182415 A1* | 6/2017 | Fukuda | A63F 13/86 |
| 2017/0228600 A1* | 8/2017 | Syed | G06V 20/62 |
| 2017/0270128 A1* | 9/2017 | Smith | A63F 13/80 |
| 2018/0077440 A1* | 3/2018 | Wadhera | H04N 21/8456 |
| 2018/0085672 A1* | 3/2018 | Oiso | A63F 13/32 |
| 2018/0232592 A1* | 8/2018 | Stewart | G08B 13/19606 |
| 2018/0307383 A1* | 10/2018 | Faulkner | H04N 7/155 |
| 2018/0337968 A1* | 11/2018 | Faulkner | H04L 51/046 |
| 2021/0046388 A1* | 2/2021 | Schwarz | H04N 21/8549 |
| 2021/0077911 A1* | 3/2021 | Duan | H04N 21/4667 |

OTHER PUBLICATIONS

"STRAVA—Strava Features | GPS Tracking, Maps, Analytics, Challenge Friends, Find Top Runs and Rides", pp. 1-27, Retrieved from URL : https://www.strava.com/features, Retrieved on : Jun. 30, 2021.

* cited by examiner

AUTOMATICALLY GENERATED ENHANCED ACTIVITY AND EVENT SUMMARIES FOR GAMEPLAY SESSIONS

BACKGROUND

Staying connected with others via social media, texting, or email has become an integral part of how modern society functions in this day and age. In some popular social media applications, the user is presented with an interface that displays posts, videos, and other (typically) curated information in the form of an activity feed. The activity feed may serve to appraise the user of the activities that those within the individual's network are participating in. Video games have become an increasingly popular source of social connection for people to interact with their friends or to connect with others online with similar gaming interests. Often times, users will maintain friend lists used to play one another during gameplay sessions and make social connections with other users. However, video games have historically had a limited place in activity feeds, typically serving as a way to covertly or overtly encourage others to play.

Some gaming systems provide rudimentary activity feeds for gaming. A user may manually capture a screenshot or a clip of a gameplay session using the gaming operating system (e.g., of a console) and share with other users within their gaming social circle. These posts may be accompanied by brief descriptions of the gameplay that is captured, but typically do not provide the viewer with much context for understanding what happened in the gameplay session. In some cases, achievements that were unlocked by the player during gameplay may trigger a corresponding post on the player's social feed. However, leveraging these features requires that a game developer specifically code for the social feed interaction within the game, which not all developers are able to devote the time and resources to. Additionally, these features are accomplished using an Application Programming Interface (API) of the gaming system, which limits posting capabilities to those supported by the game engine and gaming platform. Also, in conventional gaming platforms that include activity feeds, social posts can no longer be made regarding the gameplay session once the gameplay session has been completed. Further, determining whether particular sections of video, or video clips, include interesting content (e.g., more action) is important in deciding which videos may be worth including on an activity feed so that the "interesting content" is automatically captured for review and sharing at a later time.

SUMMARY

The present disclosure relates to automatically generating and updating enhanced summaries of activity and events for gameplay sessions. In embodiments, game summaries may be generated from metadata extracted from game data of gameplay sessions that include in-game events. Systems and methods are disclosed that use the metadata to generate a game summary that collects and conveys the in-game events that occurred within one or more gameplay sessions so that a viewer can access associated screenshots, video clips, and/or other game content to better understand the one or more gameplay sessions.

In contrast to conventional systems, a game summary may be produced using an event log of in-game events and corresponding screenshots, video clips and/or other game content, each of which may be automatically generated based on analyzing video data, user input data, game data, data sent by games using an Application Programming Interface (API), and/or other data associated with a gameplay session(s). The event log may comprise metadata that indicates times of in-game events within the gameplay session and associations between the in-game events and game content items that capture the in-game events. In some embodiments, using disclosed approaches, the user may interact with in-game events with temporal context, allowing for more informed selections and a better understanding of the gameplay session. In various embodiments, using the event log, an enhanced game summary may be generated that provides such features as a timeline to convey relative timing of in-game events, a list of in-game events (e.g., thumbnails), a map of a virtual environment of the game that is temporally annotated based on in-game events, game status information, and statistical and performance information. One or more portions of a game summary may correspond to one or more game sessions and/or players, such as to show trends over time and/or game sessions and to convey information for selected sets of players, such as teams.

BRIEF DESCRIPTION OF THE DRAWINGS

The present systems and methods related to the generation of automatic game summaries for gameplay sessions are described in detail below with reference to the attached drawing figures, wherein.

DETAILED DESCRIPTION

Figure 1:
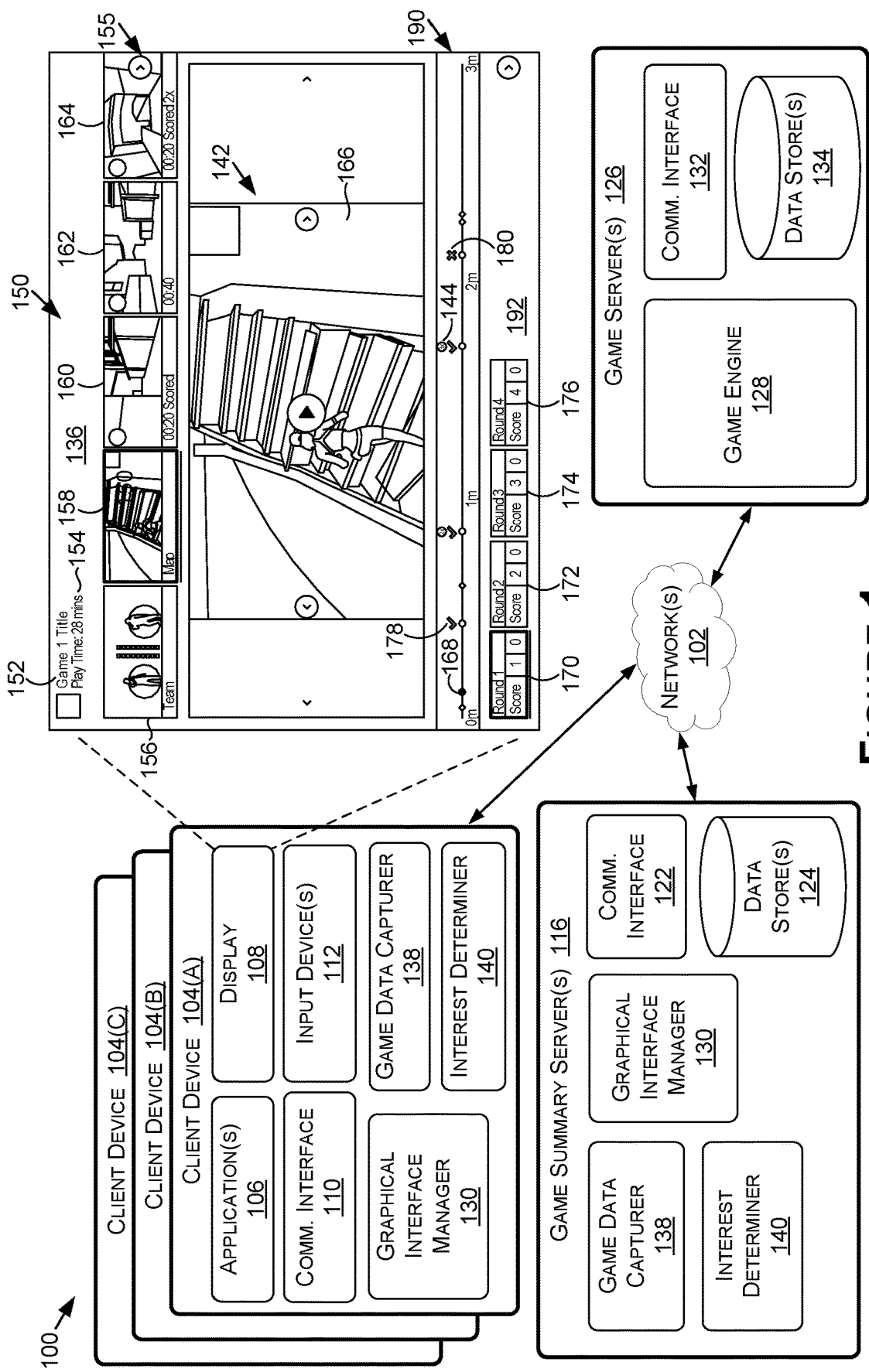
FIG. 1 is an example system diagram of a game summary system, in accordance with some embodiments of the present disclosure.

The present disclosure relates to automatically-generated game summaries for gameplay sessions. In embodiments, game summaries may be generated from metadata extracted from game data of gameplay sessions that include in-game events. Systems and methods are disclosed that use the metadata to generate a game summary that conveys the in-game events that occurred within one or more gameplay sessions so that a viewer can access, view, and curate (e.g., for publication within a social network) associated screenshots, video clips, and/or other game content to better understand the one or more gameplay sessions.

A game summary may be produced using an event log of in-game events and corresponding screenshots, video clips and/or other game content, each of which may be generated based on analyzing video data, user input data, game data, data sent by games using an Application Programming Interface (API), and/or other data associated with a gameplay session(s). The event log may comprise metadata that indicates times of in-game events within the gameplay session and associations between the in-game events and game content items that capture the in-game events. In some embodiments, using disclosed approaches, the user may interact with in-game events with temporal context, allowing for more informed selections and a better understanding of the gameplay session. One or more portions of the game summary may be displayed in an activity feed of a user and/or may be accessible from an activity feed providing a more robust view into a gamer's activity. In one or more embodiments, one or more portions of the game summary may correspond to one or more game sessions and/or players, such as to show trends over time and/or game sessions and to convey information for selected sets of players, such as teams.

In at least one embodiment, using the event log, the game summary may provide an interface in which interface elements (e.g., comprising thumbnails) that correspond to or otherwise indicate in-game events are displayed. In some embodiments, a timeline may also be displayed to convey relative timing of in-game events. In at least one embodiment, the interface elements may form a list of in-game events and may be displayed in temporal (e.g., chronological) order using the metadata. For example, each interface element may correspond to a thumbnail of a video clip or screenshot in which one or more in-game events occurred, and may be displayed in temporal order using the metadata (e.g., in an image carousel). In at least one embodiment, a user may select an interface element, which may cause an associated game content item that captures an in-game event to be loaded in the user interface.

In embodiments that include a timeline, based on the selection, the timeline may also be updated to indicate the in-game event. By way of example, the update may include visual emphasis of an icon or other indicator on the timeline that represents at least the in-game event. Additionally or alternatively, the event log may organize in-game events into rounds or matches of the gameplay session. When a user selects the interface element, the timeline may be updated to correspond to the round that includes the in-game event (e.g., displaying the round in the timeline and/or fitting the timeline to the in-game events of the round). Game status information displayed in the user interface may also be updated to correspond to the in-game event. For example, one or more player scores may be updated using the event log to reflect their state during gameplay at a time(s) associated with the in-game event.

In further respects, the user interface may include a map of a virtual environment of the game that corresponds to the gameplay session. Based on the selection of the interface element, the map may be annotated using a location and time associated with the in-game event in the metadata. The location may correspond to the player and/or another in-game object at the time and/or during or immediately after the in-game event. In various embodiments, annotating may comprise displaying and/or updating a path of the in-game object on the map, where an end-point may be based on the location and time. For example, paths or other indicators of one or more locations of the player, enemies, Non-Player Characters (NPCs), the in-game event, items, and/or other elements may be displayed on the map to reflect the state of the game leading up to, during, and/or following the in-game event. In various embodiments, the elements may be displayed using corresponding symbols or icons, and a different symbol or icon may be used for each element type.

In at least one embodiment, the game data associated with a gameplay session may be analyzed to automatically detect in-game events, which may trigger recording and/or saving of the gameplay via screenshots, videos, and/or other game content items that capture the in-game events as well as the metadata (e.g., timestamps, in-game object locations, scores, player status, player stats, gameplay participants by username, event type, kill/death/assist ratio, etc.). The analysis may be performed during a gameplay session (e.g., by analyzing a stream of one or more aspects (e.g., video, user inputs, etc.) of the gameplay, API messages from the game, and/or a viewer of a video streaming platform or application) and/or may be performed after the gameplay session (e.g., on a video file and/or a saved replay of the gameplay session or other game data).

In various embodiments, in-game events may be detected using algorithms that watch the screen for visual cues (e.g., using neural networks, computer vision, and the like). When these visual cues are detected, it may automatically trigger the recording and/or saving of the gameplay. In at least one embodiment, it may additionally or alternatively trigger further analysis of the corresponding video data to extract one or more elements of the metadata or at least some of the metadata may be derived by detection of a corresponding visual cue. The metadata, screenshots, video clips, the map (e.g., extracted from and/or associated with the game), player icons from the gameplay, and more may be stored in a data entity for use in displaying the game summary.

With reference to FIG. 1, FIG. 1 is an example system diagram of a game summary system ("GSS system") 100, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The GSS system 100 may include, among other things, client devices 104(A), 104(B), and 104(C) (referred to collectively herein as "client devices 104"), a game summary server 116, and/or a game server(s) 126. Although the client devices 104(A), 104(B), and 104(C) are illustrated in FIG. 1, this is not intended to be limiting. In any example, there may be any number of client devices 104. The GSS system 100 (and the components and/or features thereof) may be implemented using one or more computing devices.

Components of the GSS system 100 may communicate over network(s) 102. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the GSS system 100 may communicate with one or more of the other components via one or more of the network(s) 102.

The client devices 104 may include a smart phone, a laptop computer, a tablet computer, a desktop computer, a wearable device, a game console, a virtual reality system (e.g., a headset, a computer, a game console, remote(s), controller(s), and/or other components), a streaming device, a smart-home device that may include an intelligent personal assistant, and/or another type of device capable of supporting game play.

The client devices 104 may include an application(s) 106, a display 108, a communication interface 110, an input device(s) 112, a graphical interface manager 130, a game data capturer 138, and an interest determiner 140. The game summary server(s) 116 may include a graphical interface manager 130, a communications interface 122, and a data store(s) 124. The game summary server(s) 116 may also include one or more portions of the graphical interface manager 130, the game data capturer 138, and/or the interest determiner 140 in addition to or instead of those components being included in one or more of the client devices 104. The game server(s) 126 may include a game engine 128, a communications interface 132, and a data store(s) 134.

Although only some components and/or features of a client device 104, the game summary server 116, and the game server 126 are illustrated in FIG. 1, this is not intended to be limiting. For example, the client devices 104, the game summary server 116, and the game server 126 may include additional or alternative components. Further, the configuration of components is provided only as an example, but may be highly flexible depending upon the implementation of the GSS system 100. For example, as described herein, one or more of the game server(s) 126 may be embodied as one or more game summary servers 116 and/or include at least some of the functionality thereof. Examples include one or more portions of the graphical interface manager 130, the game data capturer 138 or the interest determiner 140. Similarly, at least some of the functionality of a game summary server 116 may or may not be included in an application 106 or otherwise may or may not be performed at least in part by a client device 104. Examples are indicated in FIG. 1 by illustrating the graphical interface manager 130, the game data capturer 138, and the interest determiner 140 in both the game summary server(s) 116 and a client device 104.

As an overview, the application 106 may comprise any of a variety of potential types of software capable of presenting one or more game summaries (e.g., a game summary 136) on the display 108 of the client device 104. In at least one embodiment, the application 106 (and/or a different application on one or more of the client devices 104) may comprise a game application that facilitates gameplay of a game on a client device 104 (e.g., cloud and/or local gaming) via the input device(s) 112. The communication interface 110 may include one or more components and features for communicating across one or more networks, such as the network(s) 102, such as to receive and/or transmit data corresponding to one or more game summaries (e.g., metadata, video clips, screenshots, etc.), user inputs to the input device(s) 112, streaming content, etc.

The input device(s) 112 may include any type of devices that are capable of providing user inputs to the game. The input device(s) may include a keyboard, a mouse, a microphone(s), a touch-screen display, a controller(s), a remote(s), a headset (e.g., sensors of a virtual reality headset), and/or other types of input devices.

The communication interface 110 may include one or more components and features for communicating across one or more networks, such as the network(s) 102. The communication interface 110 may be configured to communicate via any number of network(s) 102, described herein. For example, to communicate in the GSS system 100 of FIG. 1, the client devices 104 may use an Ethernet or Wi-Fi connection through a router to access the Internet in order to communicate with the game summary server(s) 116, the game server(s) 126, and/or with other client devices 104.

The graphical interface manager 130 may include any of a variety of computer-readable media. The computer-readable media may be any available media that can be accessed by the client device 104(A). The computer-readable media may include both volatile and nonvolatile media, and removable and non-removable media. By way of example, and not limitation, the computer-readable media may comprise computer-storage media and communication media. The graphical interface manager 130 may include additional or alternative components, such as those described below with respect to the memory 604 of FIG. 6.

The graphical interface manager 130 may be configured to generate game summaries and/or manage display of game summaries in a user interface, such as a user interface 150 of the application 106. The game data capturer 138 may be configured to capture game data from gameplay of games, such as metadata, video clips, and screenshots. The interest determiner 140 may be used by the game data capturer 138 and may be configured to select and/or identify one or more portions of the game data (e.g., game data that may be of interest to a user). In at least one embodiment, one or more portions of the game data capturer 138, the interest determiner 140, and/or the graphical interface manager 130 may be part of the application 106 (and/or the game engine 128).

As indicated in FIG. 1, in one or more embodiments, the game summary server(s) 116 may include at least a portion of the graphical interface manager 130, the game data capturer 138, and/or the interest determiner 140 in addition to or instead of a client device 104. The game summary server(s) 116 may be employed, for example, in client-server based implementations of the GSS system 100 with the application 106 comprising a client application. The communications interface 122 may be configured to communicate via any number of the network(s) 102, described herein, for example, to receive and/or transmit data used to generate one or more game summaries (e.g., a video stream of a gameplay session, a recording of a gameplay session, recordings, video clips, screenshots, user inputs to the input device(s) 112, streaming content, etc. used to generate metadata and/or generated from data associated with gameplay). The data store(s) 124 may be used to store any of the various information associated with the game summary server 116 (e.g., video clips, screenshots, thumbnails, game summaries, metadata, etc.).

The game engine 128 of the game server 126 may include game functionality that enables the game to be played by one or more users of a client device 104 over a network. The game engine 128 may be provided, at least in part, in a game server(s) 126 for cloud-based implementations of the GSS system 100. However, in some embodiments, the game engine 128 may be included at least partially in the application 106. The communications interface 132 may include one or more components and features for communicating across one or more networks, such as the network(s) 102. For example, the communications interface 132 may be used to transmit and/or receive user input from the input device(s) 112, video data of gameplay (e.g., recordings and/or live streams), etc.

As described herein, the application 106 may comprise any of a variety of potential types of software capable of presenting one or more game summaries (e.g., a game summary 136 in the user interface 150) on a display 108 of a client device 104. Examples of an application 106 include a mobile application, a computer application, a console application, a cloud-based game streaming application, a web-browser, a game application, a local application, a client application, a social application, a system or native application, and/or another type of application or software.

For a cloud-based game streaming application, an application 106 may include instructions that, when executed by a processor(s), cause the processor(s) to, without limitation, receive input data representative of user inputs to the one or more input device(s) 112, transmit the input data to the game server(s) 126, retrieve game data from memory or local storage, receive the game data using the communication interface 110 from the game server(s) 126, and cause display of the game on the display 108. More generally, in some embodiments the application 106 may operate as a facilitator for enabling interaction between a user and an instance of a game on the client devices 104.

An application 106 may additionally or alternatively include instructions that, when executed by a processor(s), cause the processor(s) to transmit data to, and receive data from, the game summary server(s) 116 (e.g., game data, game summaries, etc.). For example, the application 106 may transmit to the game play capture server(s) 116 video recordings generated when games are played on one or more of the client devices 104, and receive from the game play capture servers(s) 116 video clips, metadata, screenshots, game summary data, and/or other data extracted from the game data. Game data herein may generally refer to data associated with one or more gameplay sessions of one or more games, such as video data, audio data, one or more API messages from one or more games (e.g., including or identifying one or more in-game events), and/or user input data (e.g., from a user input device 112). Additionally or alternatively, the game summary server(s) 116 may receive at least some of the game data from the game server 126.

In one or more embodiments, the client devices 104 may render the game using the application 106 (e.g., running on the client devices 104), while in other examples, the client devices 104 may receive display data (e.g., encoded display data, as described with respect to FIG. 8) and use the display data to display the game (e.g., running on the game server(s) 126) on the display 108. In some examples, a first client device, such as client device 104(A), may render the game while a second client device, such as client device 104(B), may receive the display data and display the game using the display data. In examples where the display data is received by the client device (e.g., where the client device 104 does not generate the rendering), the GSS system 100 may be part of a game streaming system, such as the game streaming system 800 of FIG. 8, described in more detail below.

The display 108 may include any type of display capable of displaying a game and/or a game summary (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

As described herein, an application 106 of a client device 104 may display, via the display 108, one or more game summaries, such as the game summary 136 in the user interface 150. To do so, the graphical interface manager 130 may generate one or more game summaries and/or manage display of game summaries in the user interface 150 of the application 106. In one or more embodiments, one or more data structures that represent game summaries and/or portions thereof may be generated client and/or server-side. Rendering the data structure(s) as a User Interface (UI) may be handled by an application running on a client device (e.g., an application 106).

In at least one embodiment, the graphical interface manager 130 may generate a game summary using metadata of an event log of in-game events and corresponding screenshots, video clips, and/or other game content, each of which may be generated automatically by the game data capturer 138 based on analyzing game data associated with a gameplay session(s). The metadata may indicate timing information of in-game events within the gameplay session(s) and associations between the in-game events and screenshots, video clips, and/or other game content that captures the in-game events. By way of example and not limitation, the metadata may comprise timestamps of in-game events and/or game content that corresponds to the in-game events (e.g., start times, end times, times of non-durational events, etc.). The timestamps may be used to display data corresponding to the in-game events with temporal context (e.g., via a timeline, thumbnails on a grid, icons on a map, tables of stats per round, etc.).

In one or more embodiments, an event log may organize in-game events into rounds or matches of a gameplay session. For example, the metadata may delineate round and time ranges or segments that correspond to the rounds. Other examples of metadata that may be associated with times, in-game events and/or rounds includes in-game object locations, scores, player status, player stats, gameplay participants by username, event type, score vs scored against or assist ratios, and/or other information used to configure the game summary 136.

The game summary 136 displayed in the user interface 150 may take a variety of potential forms and may be displayed within a variety of potential contexts (e.g., with an activity feed, a social feed, a gaming application, a game streaming application, etc.). By way of example and not limitation, the game summary 136 in FIG. 1 includes a list 155 of in-game events, visual indicators, and/or interface elements, a game content display region 142, a timeline 190, a round display region 192, a game name 152 of a game that corresponds to the game summary, as well as an amount of time 154 that the game was played for in one or more game sessions that correspond to the game summary 136. As described herein, the game summary 136 may include less than all of those features and/or different features or combinations thereof.

The list 155 may correspond to screenshots, video clips, and/or other game content captured from the game session(s) (e.g., by the game data capturer 138). For example, the list 155 includes entries 156, 158, 160, 162, and 164 displayed using visual indicators which may comprise images (e.g., thumbnails), of corresponding screenshots and/or video clips. The list 155 may take various forms, but is shown as a band or carrousel. In various embodiments, the list 155 may take the form of a carrousel, gallery, a banner rotator, a banner slider, a vertical list, a horizontal list, a grid, and/or a scrolling slider.

The entries of the list 155 may correspond to one or more in-game events of the gameplay session(s) and the game content (e.g., video clips and/or screenshots) associated with the entries may capture or otherwise correspond to one or more portions of corresponding in-game events. The graphical interface manager 130 may use the metadata to display the entries in the list 155 in an order that corresponds to when the in-game events occurred within the gameplay session(s). For example, the time stamps may be used to display the entries chronologically according to the corresponding in-game events.

The video clips, screenshots, and/or other game content may capture highlights from the gameplay session(s) that can be viewed by the user in the game summary 136. For example, the game summary 136 may comprise interface elements corresponding to the in-game events, such as the visual indicators and/or associated checkboxes, selection regions, and/or buttons (e.g., in or associated with the list 155). A user may select one or more of the interface elements that correspond to one or more in-game events to cause the corresponding game content to be displayed, played, and/or loaded in the game content display region 142 of the game summary 136.

For example, upon selection of the entry 158, the entry 158 may be emphasized (e.g., highlighted, visually distinguished, etc.), as shown in FIG. 1, indicating the corresponding in-game event(s) and/or game content has been selected. Also upon selection of the entry 158, game content 166 that corresponds to the in-game event(s), such as a video clip, screenshot, and/or audio, may be displayed, played, and/or loaded in the game content display region 142 of the game summary 136, as shown. Where the game content 166 includes multiple items, the user may be capable of navigating through the items using the arrows shown in the game content display region 142 or other means. Additionally or alternatively, the arrows and/or other interface elements of the game content display region 142 may be used to select another entry in the list 155, such as an adjacent entry. Where another entry is selected (via the list 155, the arrows, or otherwise) the current entry(ies) may be deselected. Deselection may result in emphasis being removed from a visual indicator, as well as the corresponding game content being removed and/or replaced by the newly selected game content in the game content display region 142.

Where other elements of the game summary 136 correspond to one or more of the in-game events selected using an entry in the list 155, those elements may also be updated based on the selection. For example, other elements may similarly be emphasized and/or de-emphasized upon a selection. Examples include an entry 168 in the timeline 190, and/or an entry 170 in the round display region 192.

The game summary 136 may include various supplemental information displayed in association with entries (e.g., in the list 155, the timeline 190, the round display region 192, etc.) according to the metadata. The supplemental information may aid a user in determining which entries to select. For example, an entry may display an indication of a time and/or duration corresponding an in-game event within a game session. As an example, the entry 164 indicates that it corresponds to a 20 second video clip. As further examples, the supplemental information may comprise an indication of an event type(s) of an in-game event(s) associated with an entry. For example, the entry 164 indicates that a player that is a subject of the game summary 136 scored twice in a row. Other event types may correspond to a player being scored against, assisting, winning, losing, leveling up, etc. As a further example, the timeline 190 includes symbols such as a check mark 178, an "x" 180, and a multiplier 144 symbolizing the occurrence of one or more specific event types and/or multiples or variations thereof. Other examples of supplemental information includes game status information, such as score information, player information, team information and/or other information. As an example, the entry 170 in the round display region 192 includes scoring information that corresponds to the round (and one or more in-game events). However, game status information may similarly be presented in association with entries in the list 155 and/or the timeline 190.

The timeline 190 may be displayed to convey relative timing of one or more of the in-game events captured in the event log. Similar to the list 155, the timeline 190 may indicate the times of in-game events in association with the in-game events. Entries in the timeline 190 (e.g., the entry 168) may be positioned according to the associated time stamps. Entries that correspond to in-game events and/or game content automatically extracted by the game data capturer 138 may be visually distinguished from those manually captured by the player and/or a user (e.g., diamonds for a manual capture and circles for automatic). In at least one embodiment, each entry in the timeline 190 may correspond to (e.g., respectively) one or more entries in the list 155. For example, the entry 168 may correspond to the same in-game event(s) as the entry 158 in the list 155. In one or more embodiments, the entries in the timeline 190 may have a one-to-one correspondence with the entries in the list 155.

In one or more embodiments, each entry in the timeline may correspond to one or more items of game content similar to entries in the list 155. Also, one or more of the entries in the timeline 190 may be selectable. For example, upon selection of the entry 168, the entry 168 may be emphasized (e.g., highlighted, visually distinguished, etc.), as shown in FIG. 1, indicating the corresponding in-game event(s) and/or game content has been selected. Also upon selection of the entry 168, the game content 166 that corresponds to the in-game event(s)—such as (without limitation) a video clip, screenshot, and/or audio—may be displayed, played, and/or loaded in the game content display region 142 of the game summary 136, as shown. Where another entry is selected the current entry(ies) may be deselected. Deselection may result in emphasis being removed from a visual indicator of entry, as well as the corresponding game content being removed and/or replaced by the newly selected game content in the game content display region 142.

The round display region 192 may represent one or more in-game events organized by round. For example, the round display region 192 may include the entry 170, an entry 172, an entry 174, and an entry 176 which correspond to respective rounds of one or more gameplay sessions of the game summary 136. In one or more embodiments, the round display region 192 may be used to select a subset of the in-game events and/or corresponding entries that are displayed in one or more other portions of the game summary 136. For example, a user selection of the entry 170 may limit the list 155 and/or the timeline 190 to events that correspond to the entry 170 (e.g., that occurred within the round) and/or otherwise cause one or more of those entries to be displayed in those portions of the game summary 136, which may include replacing existing entries that do not correspond to the entry 170. In one or more embodiments, time on the timeline 190 may be scaled according to a time span of a currently selected round(s). A start time on the timeline 190 may correspond to a start of the round(s) in a gameplay session(s) and an end time on the timeline 190 may correspond to an end of the round(s) in the gameplay session(s.

In one or more embodiments, more than one round may be selected at once. Also in one or more embodiments deselection of an entry that corresponds to a round may remove entries from the other portions of the game summary 136 that correspond to the round. In some examples, selection of an entry may automatically cause a deselection of one or more currently selected entries. As indicated in FIG. 1, a selected entry may be emphasized in the game summary 136 similar to entries selected in other portions of the game summary 136. Deselection of an entry may similarly result in a de-emphasis of the entry.

Figure 2:
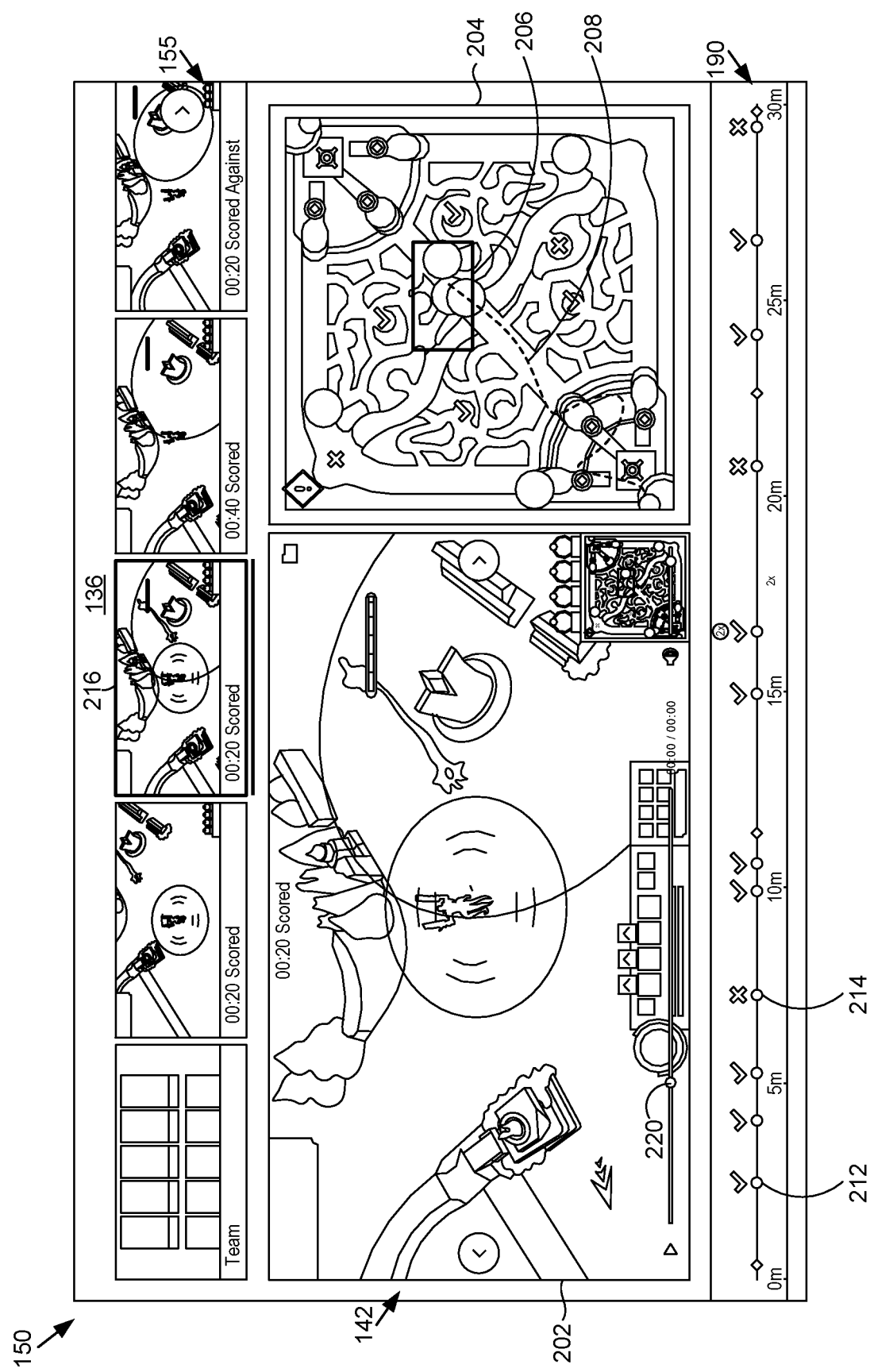
FIG. 2 illustrates an example of a game summary of in-game events that includes a map of a virtual environment in which on one or more of the in-game events occurred, in accordance with some embodiments of the present disclosure.
Figure 3:
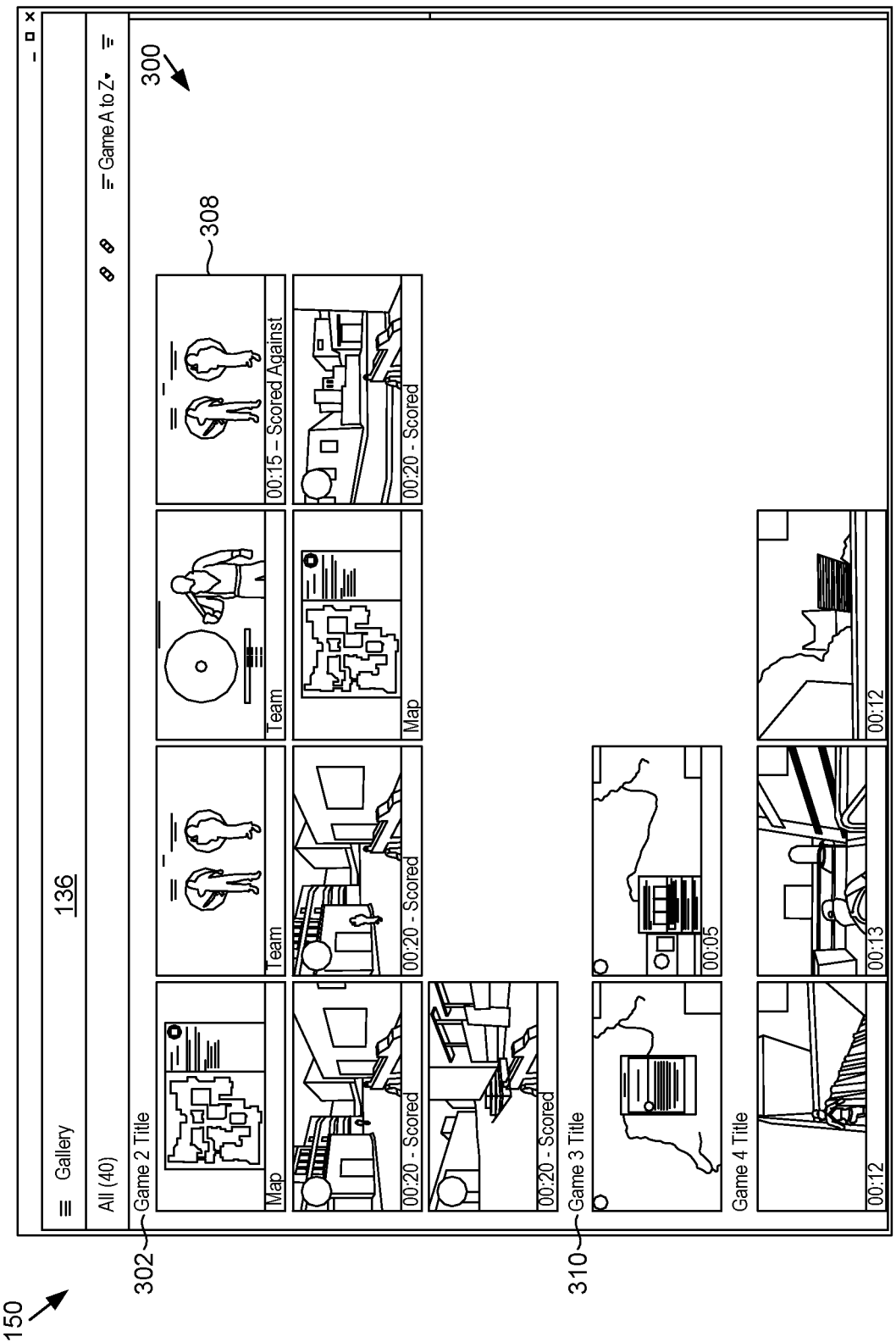
FIG. 3 illustrates an example of a game summary of in-game events that includes a gallery of game content that captures one or more of the in-game events, in accordance with some embodiments of the present disclosure.
Figure 4:
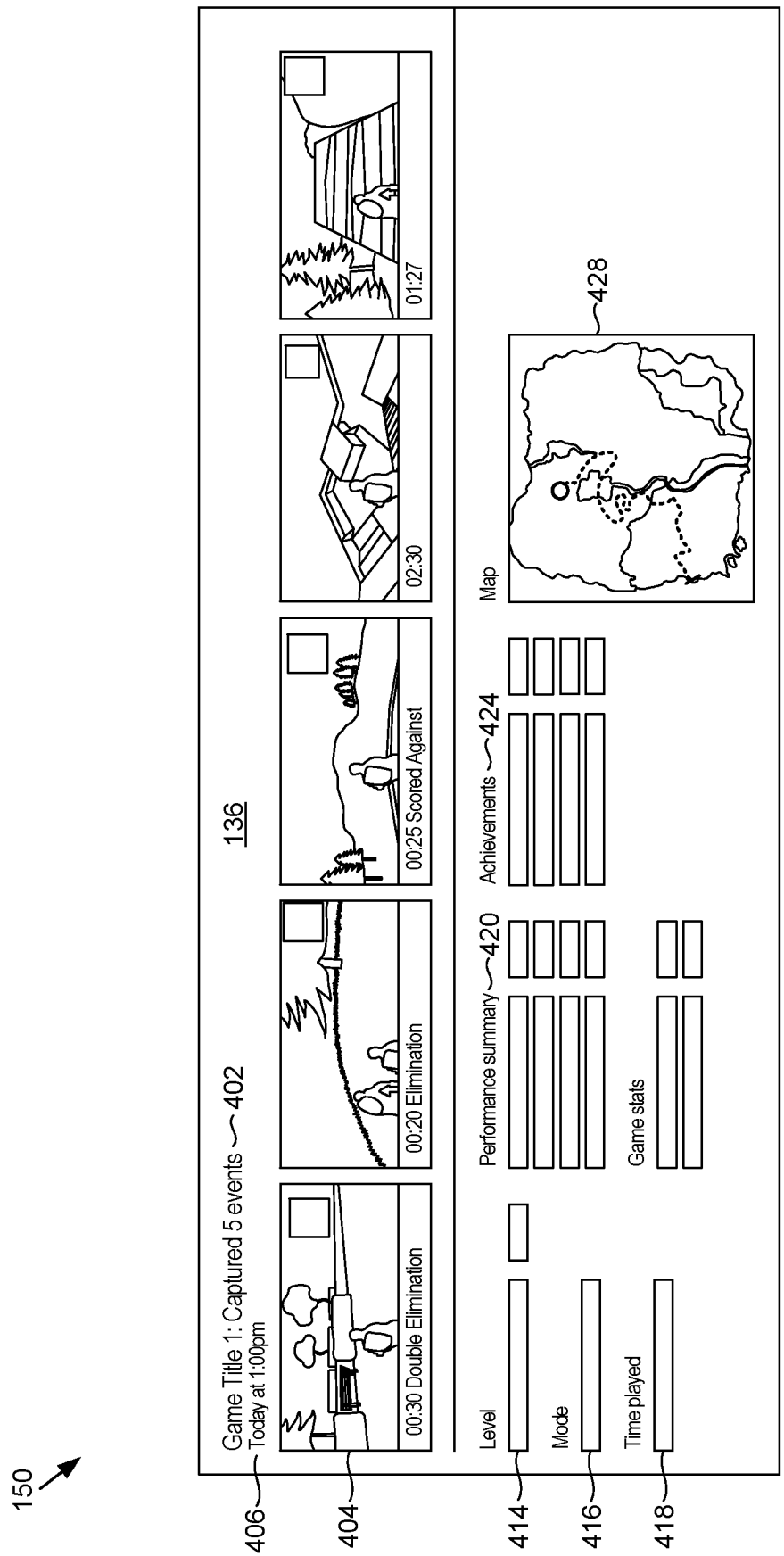
FIG. 4 illustrates examples of additional information that may be included in a game summary of in-game events, in accordance with some embodiments of the present disclosure.

Other examples of features that may be included in a game summary 136, in addition to or alternatively from those described with respect to FIG. 1, are described with respect to FIGS. 2-4. Now referring to FIG. 2, FIG. 2 illustrates an example of the game summary 136 of in-game events that includes a map 204 of a virtual environment in which on one or more of the in-game events occurred, in accordance with some embodiments of the present disclosure. By way of example and not limitation, the game summary 136 in FIG. 2 includes the list 155, the game content display region 142, and the timeline 190. The game content display region 142 is shown as including playback control elements, such as a play button and timeline that a user may interact with to review activity that took place during one or more selected in-game event.

The map 204 may be dynamically updated to illustrate movements of one or more objects and/or entities throughout the gameplay session(s) over time, as indicated by the metadata. For example, the locations of one or more players, NPCs, and/or objects may be overlaid over or otherwise used to annotate the map 204 to indicate where those objects or entities were located in the virtual environment at particular times in the gameplay session(s). The times may be based at least on other selections made in the game summary 136, such as a selected in-game event(s), game content, and/or entries in the user interface 150. For example, where the game content display region 142 corresponds to game content 202 which includes a video clip, as the video clip plays in-game events, objects, and/or entities displayed in the map 204 and/or locations or other attributes (e.g., health, item count, score, event type, etc.) thereof may be added, removed, or modified in the map 204 to reflect the game state at corresponding times in the video clip. Corresponding information used to update the map 204 may be captured in the metadata and one or more updates may occur periodically and/or continuously. Interpolation between metadata values may be used to provide intermediate values for updates. The map 204 may similarly be updated to reflect game state of other game content in the game content display region 142, such as a selected screenshot or audio clip.

In one or more embodiments, annotating the map 204 may include adding, removing, and/or updating one or more paths of one or more entities or objects throughout the virtual environment. For example a path 208 of a player (e.g., the subject of the game summary 136) throughout the game is shown with dashed lines. An endpoint of the path may correspond to the player's position associated with a point 220 in the video clip being viewed. In other examples, the endpoint may be correspond to a timestamp of a screenshot being viewed. A view indicator 206 on the map 204 may indicate where in the virtual environment the player is during the current time associated with the game content being viewed and/or may correspond to an area in the virtual environment viewable or otherwise associated with the player by the game for that time. In one or more embodiments, the map 204 may correspond to an in-game map displayed to the player during a gameplay session. The annotations to the map 204 may be limited to information known to the player account and/or viewable by the player (e.g., at the corresponding time in the game session) on the in-game map or may include information not known to the player account and/or viewable by the player (e.g., aggregated from other players or spectators).

Referring now to FIG. 3, FIG. 3 illustrates an example of a game summary 136 of in-game events that includes a gallery 300 of game content that captures one or more of the in-game events, in accordance with some embodiments of the present disclosure. In one or more embodiments, the gallery 300 may be an example of the list 155 described with respect to FIGS. 1 and 2. As indicated, the game summary 136 may correspond to in-game events and/or game content from more than one game, across more than one gaming platform, and/or more than one gameplay session. For example, a set of game content 302 is indicated as being from Game 2 and a set of game content 310 is indicated as being from Game 3. By way of example and not limitation, an image 304 is indicated to show a map associated with a game session. In one or more embodiments, a user selection of the image 304 may display the associated game content in a game content display region 142, which may be included in the game summary 136, added to the game summary 136 based on the selection, and/or included in a pop-up window based on the user selection. In one or more embodiments, a user selection of an entry may cause display of a corresponding map 204 as described with respect to FIG. 2.

Referring now to FIG. 4, FIG. 4 illustrates examples of additional information that may be included in the game summary 136 of in-game events, in accordance with some embodiments of the present disclosure. The game summary 136 of FIG. 4 includes a game title and an indicator 402 of a number of in-game events captured from a corresponding gameplay session(s) as well as an associated time 406 (e.g. "Today at 1:00 pm"). Below, images of the five captured events are shown, such as an image 404, which may correspond to the list 155 describes herein. As with entries in other examples of the list 155, notations may be included with the images or other visual indicators (e.g. double elimination, scored against, etc.). These images may act as visual previews of the in-game events and may comprise thumbnails of underlying game content.

Additionally, the game summary 136 includes game status information, such as a level(s) 414 of a game (e.g. Level 1, 2, 3, etc.) that was played, a mode(s) 416 of the game (e.g., team, capture the flag, free-for-all, etc.), and a time(s) played. The game summary 136 may also include a performance or statistical summary 420 which may include performance and/or statistical information such as number of eliminations, number of scores, points, or any other notable occurrences within one or more particular gameplay session or aggregations thereof. Game stats 422 are also included which may describe important statistics, such as the score for each round, how many round were played, number of eliminations, or any other game stat that may be useful to the user in tracking their progress during a gameplay session. In aspects, the activity feed may also include a list of achievements 424. The achievements 424 will depend on the type of game being played. For example, in a medieval themed game, the achievements 424 may include number of objectives achieved (e.g., towns conquered, enemies eliminated, etc.). In addition to these features, the activity feed can also include a map 428 which illustrates a map of the game route and the path that the user followed throughout the captured events shown in the activity feed summary 400.

Returning to FIG. 1, further examples of how in-game events and/or game content may be captured from game data are provided. As described herein, game data may refer to data associated with one or more gameplay sessions of one or more games, such as video data, audio data, one or more API messages from one or more games (e.g., including or identifying one or more in-game events), and/or user input data (e.g., from a user input device 112) generated by and/or in association with one or more games.

In one or more embodiments, the application 106 and/or the game data capturer 138 may include instructions that, when executed, record game data from gameplay sessions and store the recorded game data locally on the client device 104 or transmit the recorded game data to the game summary server 116 or the game server 126 to be stored in the data stores(s) 124 and 134, respectively. In examples where the client device 104 does not generate the rendering, the game server(s) 126 might record and store game data or transmit game data to the game summary server(s) 116 for storage in the data store(s) 124.

As explained herein, it may be desirable to identify clips (e.g., of video and/or audio) and/or other game content from among the game data that include interesting content, such as clips during which a higher amount of user input was provided and/or when certain important events occurred within a gameplay session. As such, the game data capturer 138 may be provided for this purpose.

As described herein, the game data capturer 138 may be part of the application 106 or may be part of a separate application (e.g., one or more system services, programs, etc.). The game data capturer 138 may include instructions that, when executed by a processor(s), cause the processor(s) to, without limitation, record or log game data, such as input-device usage data, video data, and/or other data associated with a gameplay session. Examples of input-device usage data includes data descriptive or representative of keyboard, mouse, or other input-device usage, and that is associated with one or more of the gameplay sessions. Examples of information that may be recorded include keyboard strokes, mouse clicks, mouse movement, microphone inputs, video-camera inputs, and/or inputs to the client devices 104 during the gameplay sessions. In addition, the game data capturer 138 may store timestamp information along with these inputs that correlates with timestamp information of game-session video data.

The game data capturer 138 may use the interest determiner 140, which may be generally configured to indicate to the game data capturer 138 game content that may be of interest to a user. It is contemplated that the interest determiner 140 may automatically identify the game content or may be manually instructed to do so by a user and/or player (e.g., via one or more user inputs or commands to create labels, bookmarks, capture events, etc.). In one or more embodiments, the interest determiner 140 may analyze game data of gameplay sessions to detect the game content. This analysis may be performed on recorded game data, such as after completion of a game session, and/or in real-time as the gameplay sessions are occurring. The interest determiner 140 may be part of the application 106 or may be part of a separate application (e.g., one or more system services, programs, etc.). In some examples, the interest determiner 140 is part of the same application as the game data capturer 138.

The interest determiner 140 may use a wide variety of potential approaches to detect the game content and/or corresponding in-game events in game data (e.g., automatically), examples of which are described herein. To do so, the interest determiner 140 analyze any form of game data, such as a game stream, recorded game data, and/or identified game content to determine and/or detect an in-game event has occurred. For example, the analysis may be used to trigger a capture event and instruct the capture (or save from a buffer) of at least a portion of game content from the game stream and/or to classify a detected in-game event and/or one or more attributes thereof (e.g., for inclusion in metadata of one or more game summaries 136). The game data capturer 138 may determine an in-game event has occurred based on artificial intelligence, object detection, computer vision, text recognition, and/or other methods of analysis. For example, the interest determiner 140 may leverage any type of machine learning model to detect in-game events and corresponding game content, such as machine learning models using linear regression, logistic regression, decision trees, support vector machine (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short terms memory, Hopfield, Boltzmann, deep belief, deconvolutional, generative adversarial, liquid state machine, etc.), and/or other types of machine learning models. In some embodiments, the machine-learning model includes a deep convolutional neural network.

Examples of in-game events that may be detected include eliminating another character in the game, collecting a certain item, scoring a goal, hitting a home run, summiting a tall building or mountain, performing or achieving a user-specified task or goal, leveling up, winning a round, losing a round, and/or another event type. For example, in some embodiments, the interest determiner 140 may recognize changes in a reticle or other interface element of a game that indicates an in-game event, such as in-game elimination of a character and trigger a capture event. As further examples, the game data capturer 138 may recognize text (e.g., using optical character recognition (OCR)) in the game instance signifying "Player 1 eliminated Player 4," or "Player 1 scored a touchdown," or other in-game events to trigger one or more capture events. Approaches that rely on object detection may analyze game visual data to identify one or more capture events and/or to classify game content.

In one or more embodiments, to identify one or more in-game events, the interest determiner 140 may determine durations of higher levels (e.g., frequencies or concentrations) of action in a gameplay session based on the game data. For example, the game data may be used to identify time segments during the gameplay sessions that include higher levels of action, and these durations or time segments may be referred to as "durations of predicted interest." While time segments are detected, particular times may be identified using disclosed approaches (e.g., for screenshots).

For example, a time segment within a gameplay session may be identified by the interest determiner 140 as high action based at least in part on the time segment having high keydowns per minute (KPMs), a high percentage of action-key selections, and/or other input-device metrics. Further, these input-device metrics may be subjected to additional analysis in order to reduce potential noise when identifying higher-action time segments. For instance, an interest-level algorithm could be applied to the input-device metrics to translate the metrics into a running activity measurement over time.

Based on values of the interest level algorithm over time, time segments can be identified that correlate with potentially high in-game activity. For example, a time segment having data points (e.g., continuously) above a threshold (e.g., an average) may be identified as correlating with a potentially highlight-worthy clip or screenshot. A start of the time segment may be based on when the running activity measurement exceeds the threshold and an end of the time segment may be based on when the running activity measurement falls below the threshold. A video clip or screenshot may then be identified that corresponds to the time segment. For example, a video clip may be stored as a discrete file that captures the frames spanning the time segment, and/or may be stored as metadata used to identify a region in the game-session video data that corresponds to the time segment (e.g., using a start timestamp, an end timestamp, and/or a time duration).

While user inputs (e.g., input-device metrics) may be used to quantify in game activity into an interest level, other types of data may be used in addition to or instead of the user inputs. For example, game-session visual and/or audio metrics could be used that correspond to in-game camera and/or field of view movement, color changes, audio volume, audio dynamics, and/or audio variation, etc. Also, while in some examples, the interest determiner 140 may identify a duration of predicted interest, which is then used to generate a video clip or screenshot, in other examples the interest determiner 140 may analyze a video clip (generated using any suitable approach) to determine whether is it sufficiently interesting, such as by using an interest-level algorithm (e.g., based on determining the average interest level of the clip is greater than a threshold).

Once time segments are identified as durations of predicted interest using any approach described herein, corresponding video segments from video data of gameplay sessions can be identified. For example, the interest determiner 140 can transmit timestamps, which correspond to the durations of predicted interest, to the application 106, the game server(s) 126, and/or the game play capture server(s) 116. Any combination of these components may then use the timestamps to generate and/or identify discrete video clips from the game-session video data described above (e.g., stored in data store(s) 124 or 134) and to timestamp the video clips or other game content in the metadata for one or more game summaries 136.

The game summary server(s) 116 may include one or more servers for storing, trimming, classifying, and/or categorizing game content and/or game data from the game sessions. Although only a few components and/or features of the game summary server(s) 138 are illustrated in FIG. 1, this is not intended to be limiting. For example, the game summary server(s) 166 may include additional or alternative components, such as those described below with respect to the computing device 900 of FIG. 9.

As further illustrated in FIG. 1, the game summary server(s) 116 may be separate or distinct from the game server(s) 126; however, this is not intended to be limiting. In some examples, the game summary server(s) 116 may be the same or similar servers to the game server(s) 126 (e.g., running as a task on the game server(s) 126). In some examples, the game summary server(s) 116 may be operated or hosted by a first entity (e.g., a first company) and the game server(s) 126 may be operated or hosted by a second entity (e.g., a second, different company). In such examples, the second entity may be a game developer, and the first entity and the second entity may share data such that the first entity can identify interesting game content using data received from the second entity. In other examples, the gameplay capturer server(s) 116 and the game server(s) 126 may be operated or hosted by the same entity. In further examples, the GSS system 100 may be implemented completely on a client device 104 and/or one or more of the components and/or functionality thereof shown as being included in a server may be at least partially implemented on the client device 104.

The game summary server(s) 116 may include one or more application programming interfaces (APIs) to enable communication of information (e.g., game data, timestamps, game content selection data, etc.) with the game server(s) 126 or the client device(s) 104. For example, the game summary server(s) 116 may include one or more game APIs that interface with the client devices 104 or the game server(s) 126 to receive game data and/or game summary data. As a further example, the game summary server(s) 116 may include one or more APIs that interface with the client device(s) 104 for transmitting classified game content and/or game summary data. Although different APIs are described herein, the APIs may be part of a single API, two or more of the APIs may be combined, different APIs may be included other than those described as examples herein, or a combination thereof.

The game server(s) 126 may include one or more servers (e.g., dedicated game servers) for storing, hosting, managing, and, in some examples, rendering a game. In some examples, first game server(s) 126 may be used to create, update, and modify a game (e.g., the program code of the game), and second game server(s) 126 may be used to host the game (e.g., as dedicated game servers). Although only a few components and/or features of the game server(s) 126 are illustrated in FIG. 1, this is not intended to be limiting. For example, the game server(s) 126 may include additional or alternative components, such as those described below with respect to the computing device 900 of FIG. 9.

The game server(s) 126 may include one or more APIs to enable game play by the client device(s) 104 and/or to enable communication of information (e.g., user profiles, game session data, game data, game summaries, etc.) with the game summary sever(s) 116 and/or the client devices 104. For example, the game server(s) 126 may include one or more game APIs that interface with the applications 106 of the client devices 104 to enable game play by the client devices 104. As a further example, the game server(s) 126 may include one or more APIs that receive the classified game content and/or other game summary data for transmitting to the client device 104. Although different APIs are described herein, the APIs may be part of a single API, two or more of the APIs may be combined, different APIs may be included other than those described as examples herein, or a combination thereof.

The game server(s) 126 may include the game engine 128. The game engine 128 may include the functionality of a game that enables a game to be played by one or more users over a network. The game engine 128 may include a rendering engine, an audio engine, a physics engine, an animation engine, an artificial intelligence engine, a networking engine, a streaming engine, a memory management engine, and/or other components or features. The game engine 128 may be used to generate some or all of the game session data during a game session.

Figure 5:
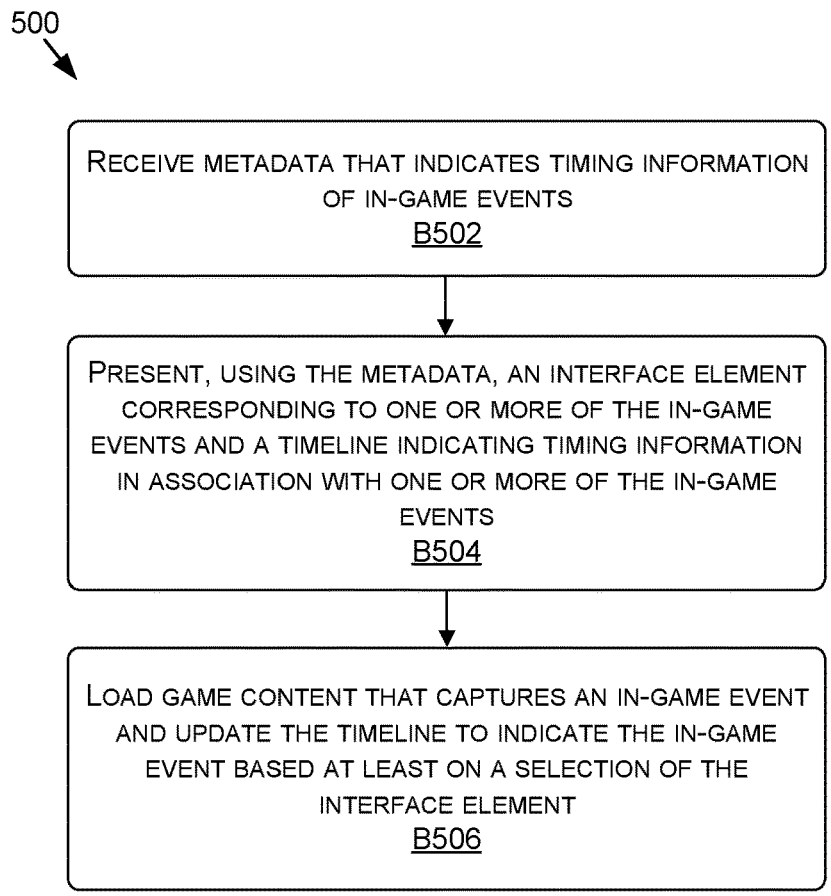
FIG. 5 is a flow diagram showing a method for presenting a game summary that includes a timeline associated with in-game events, in accordance with some embodiments of the present disclosure.

Now referring to FIG. 5, each block of method 500, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods are described, by way of example, with respect to the system of FIG. 1. However, the methods may additionally or alternatively be executed by any one system, or any combination of systems, including, but not limited to, those described herein.

FIG. 5 is a flow diagram showing a method for presenting a game summary that includes a timeline associated with in-game events, in accordance with some embodiments of the present disclosure. The method 500, at block B502, includes receiving metadata that indicates timing information of in-game events. For example, the graphical interface manager 130 and/or the application 106 may receive metadata that indicates the timing of one or more in-game events within one or more gameplay sessions and associations between the one or more in-game events and one or more video clips that capture the one or more in-game events. The in-game events may be determined based at least on analyzing video data representative of the one or more gameplay sessions and/or other game data.

The method 500, at block B504, includes presenting, using the metadata, an interface element corresponding to one or more of the in-game events and a timeline indicating timing information in association with one or more of the in-game events. For example, the graphical interface manager 130 and/or the application 106 may present, in the user interface 150 and using the metadata, one or more interface elements corresponding to one or more of the in-game events, and the timeline 190 indicating the one or more timings in association with one or more of the in-game events.

The method 500, at block B506, includes loading game content that captures an in-game event and update the timeline to indicate the in-game event based at least on a selection of the interface element. For example, the graphical interface manager 130 and/or the application 106 may load, in the user interface 150, image data of a video clip of the one or more video clips that captures one or more in-game events and update the timeline to indicate the one or more in-game events based at least on a selection of an interface element of the one or more interface elements that corresponds to the one or more in-game events, and based at least on the associations between the one or more in-game events and the one or more video clips.

Figure 6:
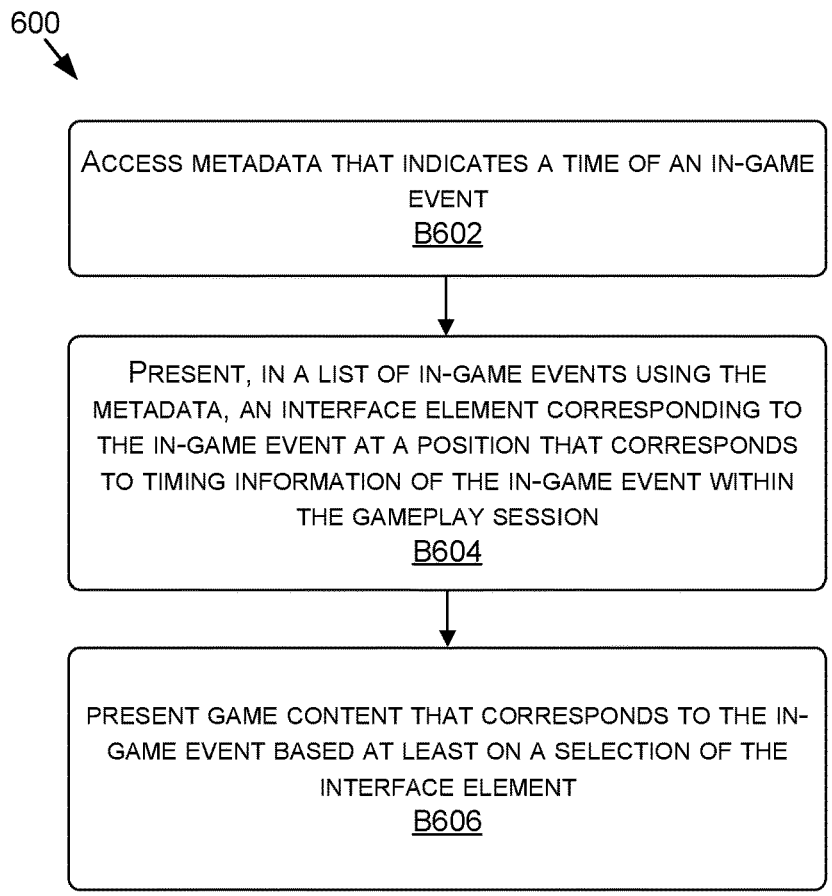
FIG. 6 is a flow diagram showing a method for presenting a game summary that includes a list associated with in-game events, in accordance with some embodiments of the present disclosure.

Referring now to FIG. 6, FIG. 6 is a flow diagram showing a method 600 for presenting a game summary that includes a list associated with in-game events, in accordance with some embodiments of the present disclosure. The method 600, at block B602, includes receiving metadata that indicates a time of an in-game event. For example, the graphical interface manager 130 and/or the application 106 may access metadata that indicates one or more times of one or more in-game events within one or more gameplay sessions and includes one or more associations between the one or more in-game events and one or more game content items (e.g., an image, a video, etc.) that capture the one or more in-game events.

The method 600, at block B604, includes presenting, in a list of in-game events using the metadata, an interface element corresponding to the in-game event at a position that corresponds to timing information of the in-game event within the gameplay session. For example, the graphical interface manager 130 and/or the application 106 may present, in the list 155 of in-game events in the user interface 150 using the metadata, one or more interface elements corresponding to the one or more in-game events at one or more positions that correspond to the timing information of the one or more gameplay sessions.

The method 600, at block B606, includes presenting game content that corresponds to the in-game event based at least on a selection of the interface element. For example, the graphical interface manager 130 and/or the application 106 may present the one or more game content items that correspond to the one or more in-game events in the user interface based at least on one or more selections of the one or more interface elements in the list of in-game events and the one or more association between the one or more in-game events and the one or more game content items.

Figure 7:
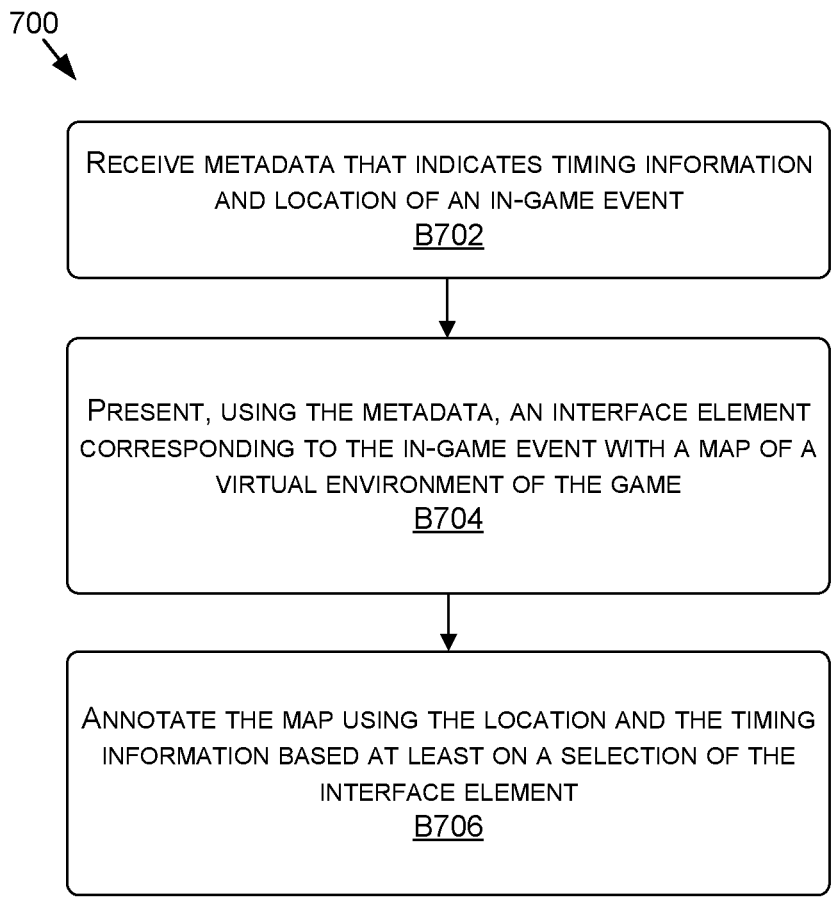
FIG. 7 is a flow diagram showing a method for presenting a game summary that includes a map of a virtual environment associated with in-game events, in accordance with some embodiments of the present disclosure.

Referring now to FIG. 7, FIG. 7 is a flow diagram showing a method 700 for presenting a game summary that includes a map of a virtual environment associated with in-game events, in accordance with some embodiments of the present disclosure. The method 700, at block B702, includes receiving metadata that indicates timing information and location associated with an in-game event. For example, the graphical interface manager 130 and/or the application 106 may receive metadata indicating one or more times and one or more locations associated with an in-game event of a gameplay session of a game. The in-game event may be determined based at least on analyzing game data associated with the gameplay session.

The method 700, at block B704, includes presenting, using the metadata, an interface element corresponding to the in-game event with a map of a virtual environment of the game. For example, the graphical interface manager 130 and/or the application 106 may present, using the metadata, one or more interface elements that correspond to one or more in-game events of the gameplay session with one or more maps of one or more virtual environments of the game.

The method, at block B706, includes annotating the map using the location and the timing information based at least on a selection of the interface element. For example, the graphical interface manager 130 and/or the application 106 may annotate at least one of the one or more maps using the one or more locations and the timing information associated with the one or more in-game events based at least on one or more selections of one or more of the interface elements that correspond to the one or more in-game events.

Figure 8:
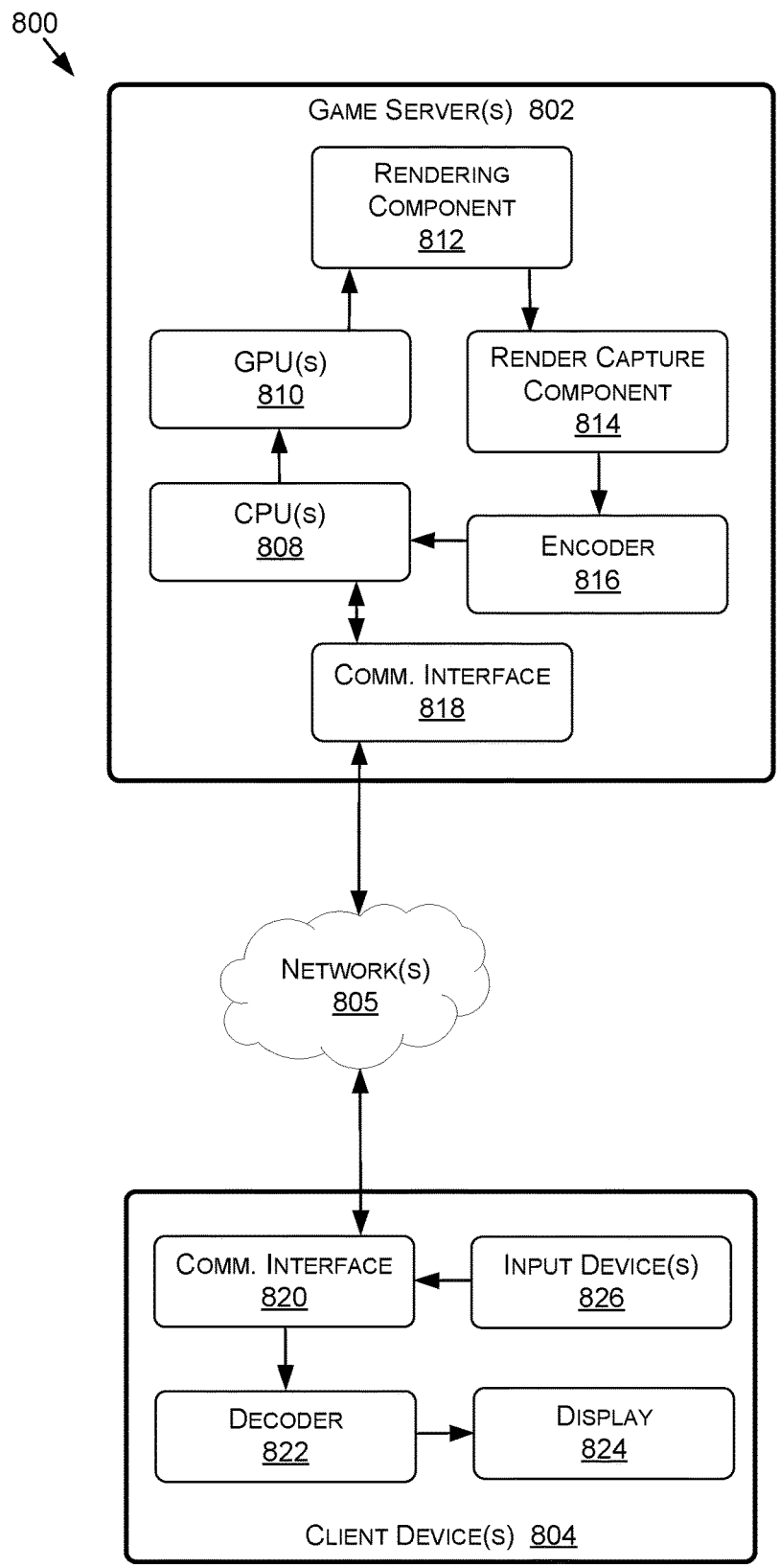
FIG. 8 is an example system diagram for a game streaming system, in accordance with some embodiments of the present disclosure.

Now referring to FIG. 8, FIG. 8 is an example system diagram for a game streaming system 800, in accordance with some embodiments of the present disclosure. FIG. 8 includes game server(s) 802 (which may include similar components, features, and/or functionality to the game server(s) 126 of FIG. 1 and/or the computing device 900 of FIG.

Figure 9:
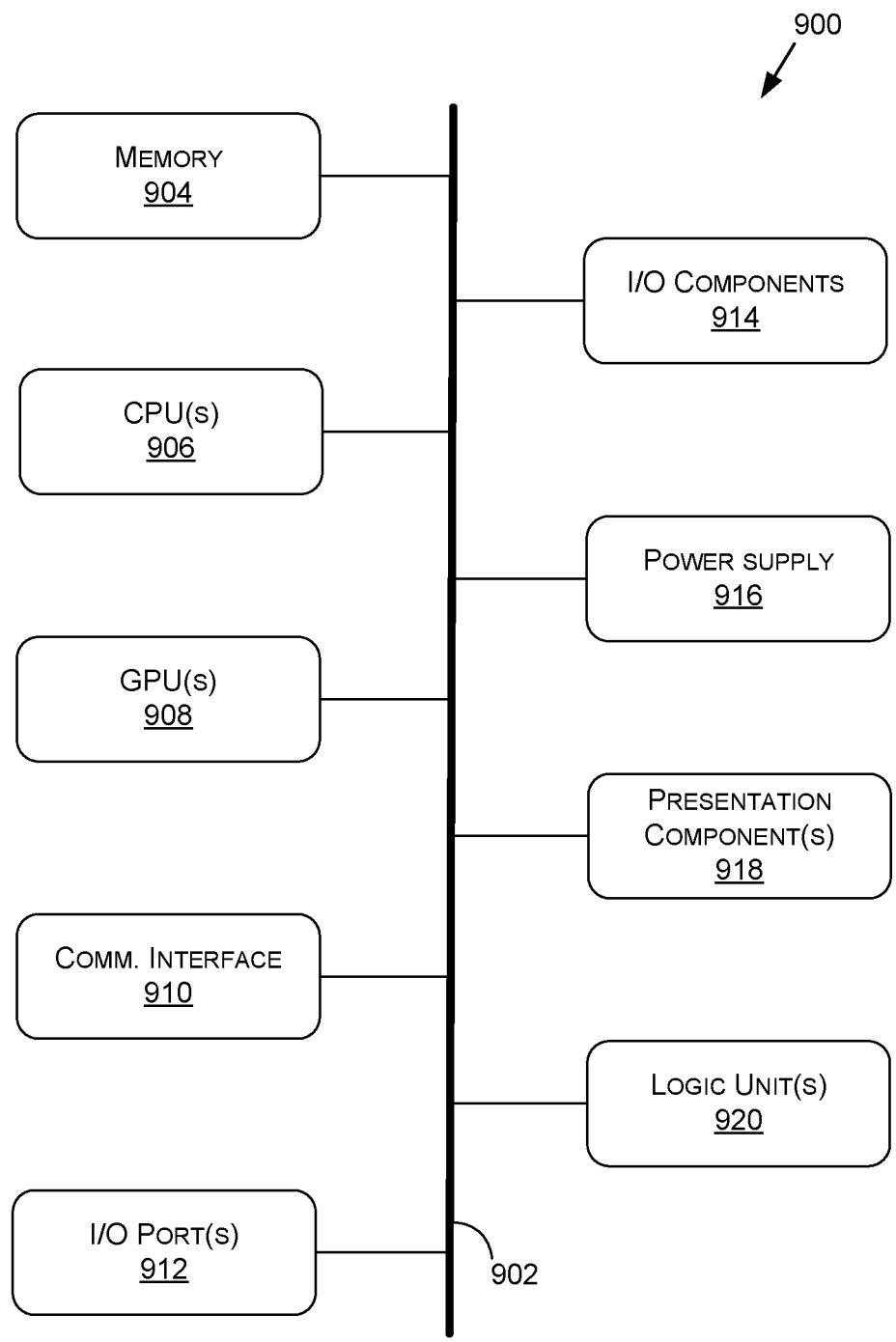
FIG. 9 is a block diagram of an example computing environment suitable for use in implementing some embodiments of the present disclosure.

9), client device(s) 804 (which may include similar components, features, and/or functionality to the client devices 104 of FIG. 1 and/or the computing device 900 of FIG. 9), and network(s) 805 (which may be similar to the network(s) 102 of FIG. 1). In some embodiments of the present disclosure, the game streaming system 800 may be implemented. The application session may correspond to a game streaming application (e.g., NVIDIA GEFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the game streaming system 800, for a game session, the client device(s) 804 may only receive input data in response to inputs to the input device(s), transmit the input data to the game server(s) 802, receive encoded display data from the game server(s) 802, and display the display data on the display 824. As such, the more computationally intense computing and processing is offloaded to the game server(s) 802 (e.g., rendering of the game session is executed by the GPU(s) of the game server(s) 802). In other words, the game session is streamed to the client device(s) 804 from the game server(s) 802, thereby reducing the requirements of the client device(s) 804 for graphics processing and rendering.

For example, with respect to an instantiation of a game session, a client device 804 may be displaying a frame of the game session on the display 824 based on receiving the display data from the game server(s) 802. The client device 804 may receive an input to one of the input device(s) and generate input data in response. The client device 804 may transmit the input data to the game server(s) 802 via the communication interface 820 and over the network(s) 806 (e.g., the Internet), and the game server(s) 802 may receive the input data via the communication interface 818. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 812 may render the game session (e.g., representative of the result of the input data) and the render capture component 814 may capture the rendering of the game session as display data (e.g., as image data capturing the rendered frame of the game session). The encoder 816 may then encode the display data to generate encoded display data and the encoded display data may be transmitted to the client device 804 over the network(s) 806 via the communication interface 818. The client device 804 may receive the encoded display data via the communication interface 820 and the decoder 822 may decode the encoded display data to generate the display data. The client device 804 may then display the display data via the display 824.

FIG. 9 is a block diagram of an example computing device 900 suitable for use in implementing some embodiments of the present disclosure. Computing device 900 may include an interconnected system or bus 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920.

In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The interconnect system 902 may represent one or more busses, such as an address bus, a data bus, a control bus, or a combination thereof. The interconnect system 902 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

Although the various blocks of FIG. 9 are shown as connected via the interconnected system) 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 906 may be configured to execute the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an ARM processor implemented using Reduced Instruction Set Computing (RISC) or an x86 processor implemented using Complex Instruction Set Computing (CISC). The computing device 900 may include one or more CPUs 606 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs. In examples where the computing device 900 does not include the GPU(s) 908, the CPU(s) 906 may be used to render graphics.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 6900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 608, the CPU(s) 906, etc.), and output the data (e.g., as an image, video, sound, etc.).

Figure 10:
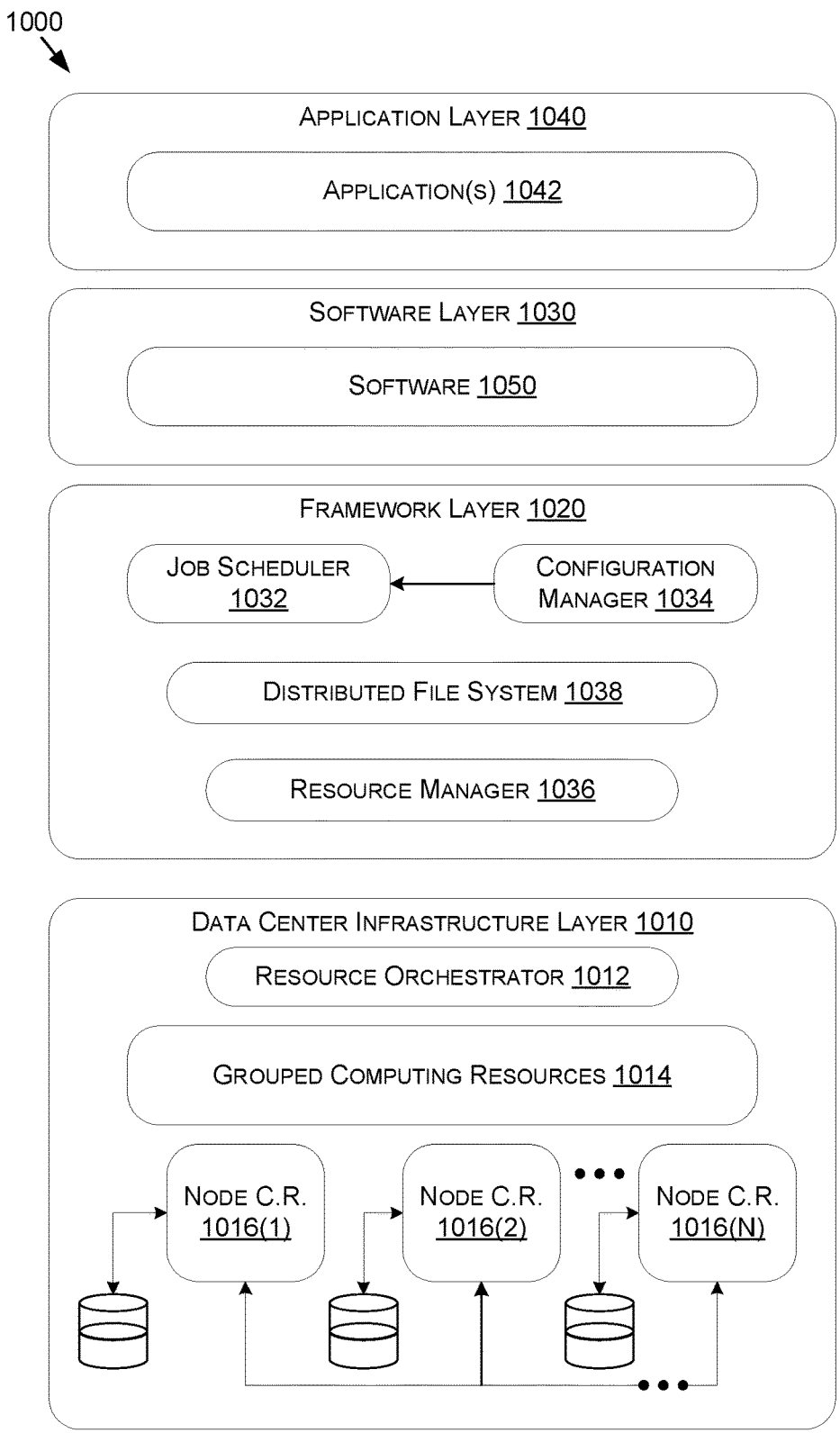
FIG. 10 is an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161(N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1032, a configuration manager 1034, a resource manager 1036, and/or a distributed file system 1038. The framework layer 1020 may include a framework to support software 1050 of software layer 1030 and/or one or more application(s) 1042 of application layer 1040. The software 1050 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1032 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1032. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1050 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016(N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving metadata that indicates timing information of one or more in-game events within a gameplay session, one or more first associations between the one or more in-game events and one or more video clips that capture the one or more in-game events, and one or more second associations between the one or more in-game events with at least one round of a plurality of rounds of the gameplay session;
   presenting, in a graphical user interface and using the metadata, one or more interface elements corresponding to the one or more in-game events using the timing information;
   displaying, in the graphical user interface, image data of at least one video clip of the one or more video clips that captures at least one in-game event of the one or more in-game events based at least on a selection of an interface element of the one or more interface elements and the first one or more associations; and
   causing, based at least on the selection, a timeline of in-game events displayed in the graphical user interface to be updated based at least one the one or more second associations.

2. The method of claim 1, wherein the selection comprises at least an image that corresponds to the at least one video clip and the at least one in-game event.

3. The method of claim 1, wherein the selection is from a list of in-game events that uses the metadata to display a plurality of the in-game events in an order that corresponds to the timing information.

4. The method of claim 1, updating of the timeline further including, causing, based at least on the selection, an update to a round display region of the graphical user interface.

5. The method of claim 1, wherein the updating includes visually emphasizing an indicator of the at least one in-game event in the timeline.

6. The method of claim 1, wherein the metadata further associates the one or more in-game events with event types, the selection is from a list of in-game events, and the metadata is used to display the event types with corresponding ones of the in-game events in the list of in-game events.

7. The method of claim 1, wherein the updating further includes using the metadata to annotate a map of a virtual environment in which the at least one in-game event occurred based at least on one or more of instances of the timing information associated with the at least one in-game event.

8. A processor comprising:
   One or more circuits to access metadata that indicates timing information, wherein the timing information corresponds to an in-game event within a gameplay session, includes an association between the in-game event and one or more images that capture the in-game event, and associates the in-game event with a round of a plurality of rounds of the gameplay session;
   present, in a list of in-game events in a user interface using the metadata, an interface element corresponding to the in-game event at a position that corresponds to the timing information within the gameplay session,
   present the one or more images that corresponds to the in-game event in the user interface based at least on a selection of the interface element from the list of in-game events and the association between the in-game event and the one or more images, and
   cause, at least by the selection, a timeline of in-game events displayed in the user interface to be updated to correspond to the round.

9. The processor of claim 8, wherein the one or more images comprises a video clip of the gameplay session.

10. The processor of claim 8, further comprising visually emphasizing the interface element of the in-game event in the list of in-game events based at least on the selection.

11. The processor of claim 8, wherein the metadata further associates the in-game event with an event type and the metadata is used to display the interface element of the in-game event with an indicator of the event type.

12. The processor of claim 8, wherein the selection further causes an update to a round display region of the user interface.

13. The processor of claim 8, further comprising using the metadata to update game status information displayed in the user interface to correspond to the in-game event based at least on the selection.

14. The processor of claim 8, further comprising using the metadata to annotate a map of a virtual environment in which the in-game event occurred based at least on the timing information corresponding to the in-game event.

15. A system comprising:
   one or more processing units;
   one or more memory devices storing instructions, that when executed using the one or more processing units, cause the one or more processing units to execute a method comprising:
      receiving metadata indicating timing information and a location associated with an in-game event of a gameplay session of a game, wherein the in-game event is determined based at least on analyzing game data associated with the gameplay session;
      presenting, using the metadata, interface elements that correspond to in-game events of the gameplay session with a map of a virtual environment of the game; and annotating the map using the location and the timing information associated with the in-game event based at least on a selection of one or more of the interface elements that correspond to the in-game event.

16. The system of claim 15, wherein the annotating comprises presenting a path of an in-game object of the game on the map, wherein an end-point of the path is based at least on the timing information.

17. The system of claim 15, wherein the annotating comprises presenting a position of an in-game object of the game on the map based at least on the location and the timing information.

18. The system of claim 15, wherein the annotating comprises presenting a position of one or more in-game events of the game on the map based at least on the location and the timing information.

19. The system of claim 15, wherein the annotating comprises presenting a symbol of the in-game event based at least on an event type specified for the in-game event in the metadata.

20. The system of claim 15, wherein the interface elements are displayed in a timeline of a user interface at positions that correspond to timing information corresponding to the in-game events in the gameplay session.

* * * * *